United States Patent

Baron et al.

[11] Patent Number: 5,810,329
[45] Date of Patent: Sep. 22, 1998

[54] CONTROL SYSTEM FOR PROVIDING DUAL VACUUM LEVELS

[75] Inventors: Tibor Baron, Decator, Ill.; Kenneth Roat, Troy, Mich.; Thomas Johnson, Dixon, Ill.

[73] Assignee: Borg-Warner Automotive, Inc., Sterling Heights, Mich.

[21] Appl. No.: 666,132

[22] Filed: Jun. 19, 1996

(Under 37 CFR 1.47)

[51] Int. Cl.$^6$ .................................................. F16K 31/02
[52] U.S. Cl. .............................. 251/129.15; 251/129.01; 251/129.16; 137/82; 361/160
[58] Field of Search ........................ 251/129.15, 129.01, 251/129.05, 129.16; 364/557; 137/82; 180/233; 361/154, 160; 307/9.1, 10.1; 335/290, 255

[56] References Cited

U.S. PATENT DOCUMENTS

| | | | |
|---|---|---|---|
| 3,203,447 | 8/1965 | Bremner et al. | 251/129.01 |
| 3,709,253 | 1/1973 | Spangenberg | 251/129.15 |
| 3,921,670 | 11/1975 | Clippard, Jr. et al. | 251/129.15 |
| 4,755,958 | 7/1988 | Mizuhara | 364/557 |
| 5,027,846 | 7/1991 | Baron | 137/82 |

FOREIGN PATENT DOCUMENTS 62-266283  11/1987  Japan ................................ 251/129.15

Primary Examiner—Denise L. Ferensic
Assistant Examiner—John Ball
Attorney, Agent, or Firm—John A. Artz, Esq.; Greg Dziegielewski, Esq.

[57] ABSTRACT

A solenoid-type control system is disclosed, particularly for operating the locking hubs of a four-wheel drive vehicle. A solenoid valve assembly or mechanism has a coil member, a tubular member for directing air flow, and a valve mechanism at one end of the tubular member. A control circuit determines the level of energizing signal to the coil member which in turn controls the valve mechanism and the air flow passing through the tubular member. A switch mechanism has a moveable terminal which is operated by the level of energizing electrical signal.

6 Claims, 2 Drawing Sheets

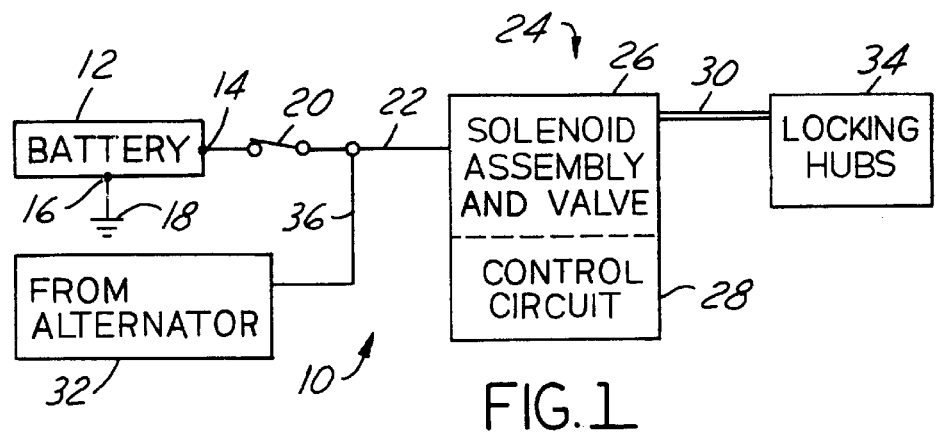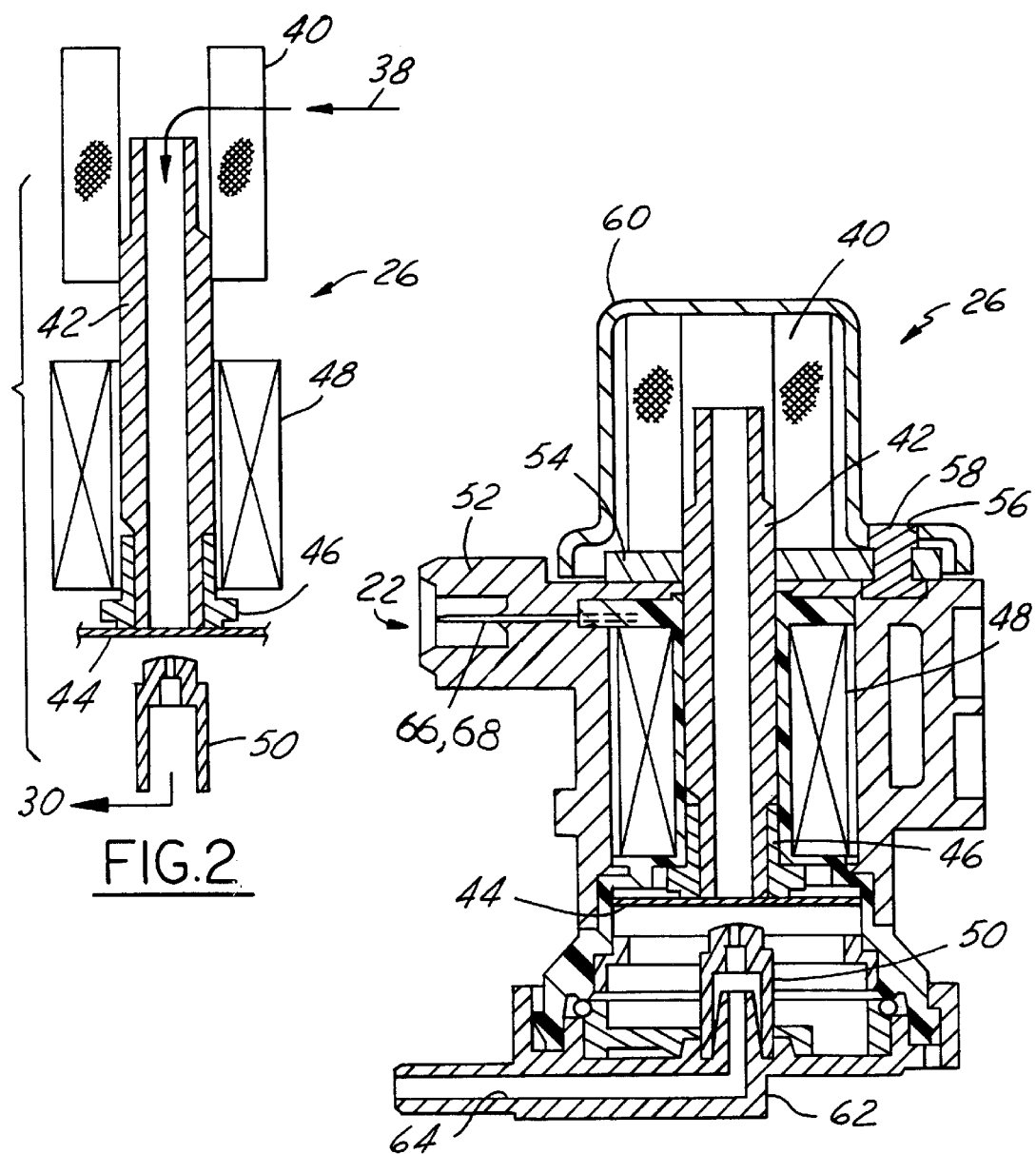

CONTROL SYSTEM FOR PROVIDING DUAL VACUUM LEVELS

TECHNICAL FIELD

The present invention is directed to a solenoid and solenoid control system, and more particularly to the combination of a proportional solenoid valve assembly and a control circuit which regulates the solenoid valve assembly to provide two vacuum levels.

BACKGROUND OF THE INVENTION

Various systems have been devised and implemented to regulate the operation of control systems in automobiles and other vehicles. Some of these systems are used to regulate the activation and release of locking hubs which provide for four-wheel drive for the vehicles. Often different levels of air pressure, or different vacuum levels, are used to lock and unlock these hub mechanisms.

One regulating system now in use employs a pair of three-way solenoid valves, a vacuum regulator and a plurality of attendant vacuum hoses. This system is bulky and expensive. Other regulating systems utilize other types of operating systems, but these also have disadvantages, such as weight, expense and reliability.

It is therefore a principal object of the present invention to provide a new regulating system for vehicles which is an improvement over known regulating systems. It is another object of the present invention to provide a new solenoid-type control system which is an improvement over known systems.

It is still another object of the present invention to provide a solenoid-activated vehicle control system which is an improvement over known solenoid-activated vehicular systems. It is a further object of the present invention to provide a solenoid-activated control system which is smaller, less expensive and/or more reliable than known systems.

SUMMARY OF THE INVENTION

The above and other objects are met by the present invention which is an improvement over known solenoid-type vehicle control systems. In particular, the present inventive system includes a solenoid-activated valve assembly or mechanism and a unique control circuit. The valve assembly includes a tubular member for directing air flow through the valve, and a coil member which has two end connections. The level of current flow through the coil member effectively controls the air flow through the valve.

The control circuit of the invention determines the level of an energizing electrical signal which, in turn, regulates the air flow through the valve assembly. The circuit comprises means for supplying a potential to a first connector to the solenoid coil member. A switch mechanism has two fixed terminals, and a movable third terminal which is movable between the two fixed terminals. The third, movable terminal is coupled to a plane of potential different from the potential applied to the first connector to the coil member. An impedance is coupled between the second connector to the coil member and a first fixed terminal of the switch mechanism. The second connector is also connected to the second fixed terminal of the switch. The circuit provides two different levels of energizing electrical signals to the coil member depending on the position of the movable terminal of the switch. This regulates the air flow through the solenoid valve assembly.

Preferably, the present invention will be used to engage and disengage the hub locks of a vehicle by supplying two different vacuum levels to the hubs. The solenoid has a supply vacuum of manifold vacuum and an operating voltage range of 8 to 18 volts DC.

Other features, benefits and advantages of the invention will become apparent when the following description of the invention is viewed together with the accompanying drawings and appended claims.

BRIEF DESCRIPTION OF THE DRAWINGS

FIG. 1 is a schematic block diagram of the present invention;

FIG. 2 is a schematic diagram showing the major components of a solenoid valve assembly in accordance with the present invention;

FIG. 3 is a cross-sectional side view of a solenoid valve assembly mechanism for use with the present invention;

BEST MODE(S) FOR CARRYING OUT THE INVENTION

Figure 4:
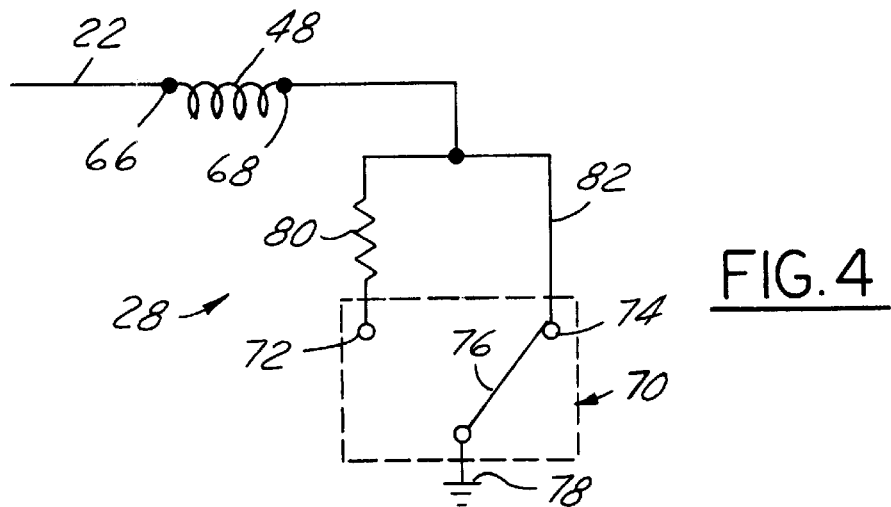
FIG. 4 is a schematic diagram of the control system in accordance with the present invention.

The present invention is part of a system which is referred to generally by the reference numeral 10 in FIG. 1. In the drawings, like reference numerals in separate Figures identify like components.

The system 10 includes a battery 12, or any other conventional energy source used to energize the starting system of a vehicle (not shown). The potential difference of the battery 12 is applied to the output terminals 14 and 16. Terminal 16 is connected to ground 18 while terminal 14 is coupled to ignition switch 20 and conductor 22. Conductor 22 connects the battery to the inventive system 24 which includes a solenoid valve assembly or mechanism 26 and a control circuit 28. The output of the solenoid valve assembly 26 is coupled over vacuum line 30 to the locking hubs 34 of the vehicle. After the vehicle is started and the engine is driving a conventional alternator-rectifier system 32, the system 24 is supplied with the requisite energizing potential difference over line 36.

FIG. 2 depicts in simplified form the basic components of the solenoid valve assembly 26 used in the inventive system 24. Air flow, represented by the arrow 38, passes through an annular filter 40 and flows downwardly through a tubular member 42. Member 42 is made of a magnetic material and is part of the magnetic circuit of the solenoid valve. An armature 44, also of magnetic material, is formed in the shape of a disk and positioned below the end of tubular member 42. A primary valve seat member 46, formed of brass or other non-magnetic material, is positioned at the end of tubular member 42 and acts to abut armature 44 when a high level of current flows through the solenoid coil 48. In this position, a high-vacuum signal is passed through line 30 to the locking hubs 34.

When current at a lower level is passed through winding or coil 48, the armature 44 is released from a position on the end of primary valve seat member 46 and assumes an intermediate position between the member 46 and secondary valve seat member 50. This allows a greater atmosphere vent to reduce the vacuum signal through line 30 to the locking hub 34. When there is no current applied to the solenoid valve assembly 26, the armature 44 seals against secondary valve seat member 50, effectively shutting off the air flow from the vacuum input. This is the basic operating arrangement of the solenoid valve assembly.

Additional details of the solenoid valve assembly are shown in FIG. 3. The central portion of the assembly is an encapsulated bobbin 52 which encircles and supports the solenoid winding 48 and provides access for the electrical line 22 which is connected to the solenoid winding. Central tubular member 42 is supported centrally within the bobbin member 52. A cam member 54 is positioned adjacent tubular member 42 in order to provide adjustment of the solenoid's magnetic circuit during production. The adjustment is made through opening 56 in cover member 60. After final adjustment, the opening 56 is filled with an epoxy material 58, or other suitable material.

The lower portion of the solenoid valve assembly 26 is covered by a lower cover member 62 which is formed to snap around the lower part of encapsulated bobbin member 52. A channel 64 is formed in the lower part of cover member 62 for connection to the vacuum source 30 (as shown in FIGS. 1 and 2). Connectors 66 and 68 supply electrical connectors to the coil member 48. In FIG. 3, only connector 66 is shown since connector 68 lies directly behind it.

It is emphasized that although a particular type of solenoid valve is depicted and described herein, other valves could be successfully used in its place. By way of example, a suitable alternative valve is described and shown in U.S. Pat. No. 5,027,846 entitled "Proportional Solenoid Valve," issued on Jul. 2, 1991, and assigned to the assignee of the present invention. Other proportional solenoid valves could also be used in combination with the control circuit of the present invention, as described below.

The schematic diagram of the control circuit 28 is shown in FIG. 4. Coil member 48 has first and second end connections 66 and 68. Conductor 22 supplies a potential to one end of coil member 48, that is, to first end connection 66. A switch mechanism 70 has first and second fixed terminal members 72 and 74, and a third, movable terminal member 76 for contacting either of the first and second terminal members. Movable terminal member 76 is connected to ground 78, which denotes a plane of potential different from that applied to the first end connection 66 of coil member 48. An impedance, shown as a simple resistor 80, is coupled between the second end connection 68 of coil 48 and the first fixed terminal member 72 of switch mechanism 70. A conductor 82 connects the second end connection 68 of coil 38 to the second fixed terminal member 74.

In this regard, conductor 82 could be any conductor means or mechanism, such as a simple drop of solder. In the same manner, switch mechanism 70, although depicted as a simple mechanical switch, could be a semiconductor switch with no moving parts, or any other conventional type of switch. Whatever components are actually utilized, the system shown FIG. 4 provides, depending upon the state of switch mechanism 70, two different levels of the energizing signal applied to coil 48 as a function of the state, or physical position of the movable terminal. This correspondingly regulates the level of vacuum supplied from the output port of the solenoid valve assembly 26 and to the locking hubs 34.

Figure 5:
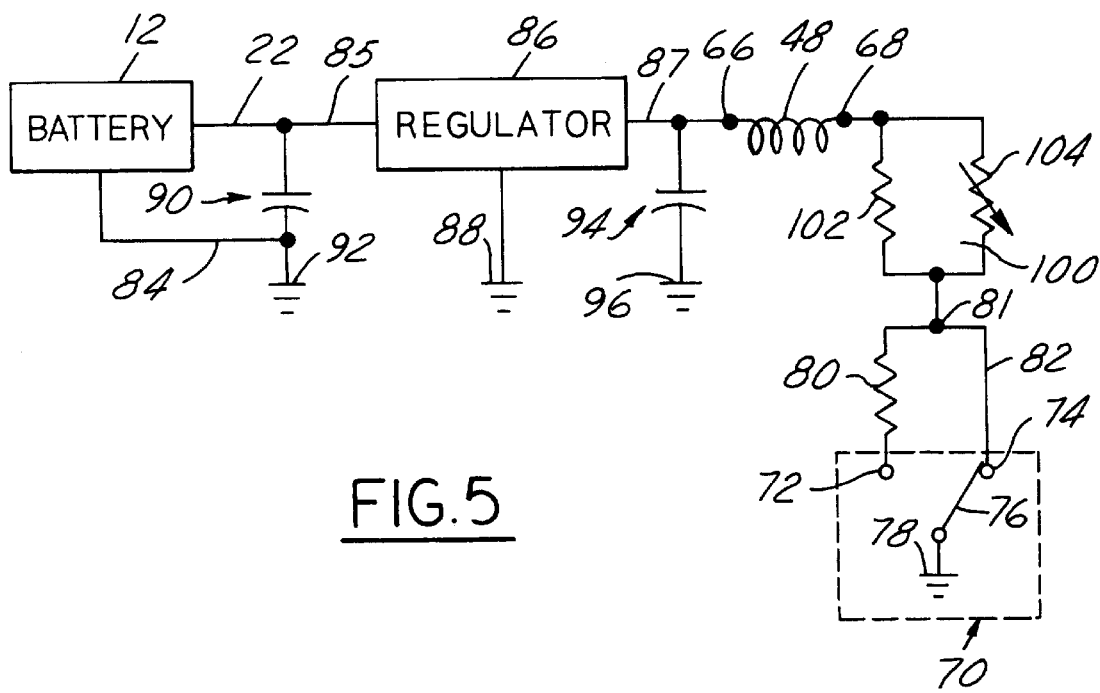
FIG. 5 is a schematic diagram of a preferred embodiment of the control system in accordance with the present invention.

FIG. 5 illustrates a preferred embodiment of the present invention. The energizing potential difference from the vehicle battery 12 is applied over conductors 22 and 84 to the circuit shown. Conductor 22 is coupled to the input side 85 of an 8-volt voltage regulator 86, which also has a terminal connected to circuit ground 88. Capacitor 90 has one side connected to conductor 22 and to the input of voltage regulator 86. The other side of capacitor 90 is connected to ground 92 and to conductor 84. The output side 87 of regulator 86 is coupled to the first end connection 66 of the solenoid coil member 48, and also to one side of a capacitor 94. The other side of the capacitor 94 is connected to ground 96.

A parallel circuit 100, comprising a resistor 102 and a thermistor 104, is coupled in series between the second end connection 68 of coil 48 and the common connection 81 between resistor 80 and conductor 82. Resistor 102 adjusts the actual voltage applied to coil 48 for suitable current flow through the coil when the system is operating. Thermistor 104 provides temperature compensation for the circuit. The capacitors and circuit 100 are not required to implement the control circuit in accordance with the present invention, but are used to optimize the complete system.

In its preferred use, the present invention is used to engage and disengage the hub locks of a vehicle by supplying two different vacuum levels to the hubs. The solenoid valve assembly has a supply vacuum of manifold vacuum and an operating voltage range of 8–18 volts DC. When a high vacuum condition is required, switch mechanism 70 is in the position shown in FIG. 5, and the output signal at a high vacuum level is supplied over line 30 to the locking hubs 34. When a low vacuum level signal is required, movable terminal 76 of mechanism 70 is displaced to contact terminal 72, placing resistor 80 in series with the solenoid coil member 48 and thus lowering the current flow through the solenoid coil. This switches the output signal to a low vacuum level which is supplied over line 30 to the locking hub assembly. If no potential is applied over line 22 to the control circuit, there is no vacuum output signal. Under such a condition, there also is not any change in the position of the locking hubs.

The present invention is a significant advantage over known hub-lock control systems which utilize a pair of three-way solenoid valves, a vacuum regulator, and tubes which intercouple the two solenoid valves and the other components. Not only does the present invention provide a significant cost saving, but it also reduces the space required to mount the total control system. In this regard, with the present invention, a pair of three-way solenoid valves are replaced by a single proportional solenoid valve assembly, when accompanied by a control circuit which operates the solenoid as a multi-position unit instead of a conventional continuously variable operation.

As used herein, the term "impedance" includes a pure resistance, or a reactive component (such as a capacitor or an inductor) having a component of resistance, or some combination of resistance and reactance. Also, the terms "connected" and "connecting," as used herein, mean a direct electrical connection between two components, with virtually zero DC resistance between those two components. "Coupled" and "coupling" mean there may be an additional component, the atmosphere, or something else positioned between the two components, and something other than a zero resistance (or a zero impedance) between those two components.

While the best mode for carrying out the invention has been described in detail, those familiar with the art to which this invention relates will recognize various alternative designs and embodiments for practicing the invention as defined by the following claims.

What is claimed is:

1. A control system comprising:

a solenoid valve assembly having a tubular member for directing air flow and a coil member with first and second end connectors for effectively controlling the air flow level;

a control circuit for determining the level of energizing electrical signal and in turn regulating the air flow level through said solenoid valve assembly;

said control circuit comprising:

means for supplying a potential to said first end connection of the coil member;

switch means having first and second fixed terminals, and a third movable terminal for contacting either of said first and second terminals;

means for coupling said third movable terminal to a plane of potential different from the potential applied to the first end connection of the coil;

an impedance coupled between said second end connection of the coil member and said first fixed terminal of the switch; and means connecting said second end connection of the coil member to said second fixed terminal of the switch;

whereby two different levels of an energizing electrical signal are provided to said coil member as a function of the position of said third movable terminal, and correspondingly regulating the level of vacuum output of said solenoid valve assembly.

2. The system as set forth in claim 1 in which said solenoid valve assembly includes a primary valve seat member adjacent said coil member and tubular member, a secondary valve seat member spaced from said primary valve seat member, and an armature member positioned between said primary and secondary valve seat member for movement between said primary and secondary valve seat members as a function of the strength of the magnetic field produced by said coil member.

3. The combination of a solenoid valve assembly and a control circuit comprising:

a solenoid valve assembly having a tubular member for directing air flow, a coil member having first and second end connections and positioned adjacent said tubular member for producing a magnetic field varying in relation to the strength of an energizing electrical signal, a primary valve seat member adjacent said coil member and said tubular member, a secondary valve seat member spaced from said primary valve seat member, and an armature positioned between said primary and secondary valve seat members for movement between those seat members as a function of the strength of the magnetic field produced by said coil member, and first and second electrical conductors for passing an energizing electrical signal to said coil member; and a control circuit for determining the level of the energizing electrical signal passed to said coil member, said control circuit having means for supplying a potential to said first end connection of said coil member, switch means having first and second fixed terminals and a third movable terminal for contacting either of said first and second fixed terminals, means for coupling said third movable terminal to a plane of potential different from the potential applied to said first end connection of said coil member, an impedance coupled between said second end connection of said coil member and said first fixed terminal of said switch means, and means directly coupling said second end connection of said coil member to said second fixed terminal of said switch means; and whereby two different levels of the energizing electrical signal are provided to said coil member as a function of the position of said third movable terminal, and correspondingly regulating the level of air flow through said solenoid valve assembly.

4. The combination as set forth in claim 3 in which said control circuit further comprises a voltage regulator coupled between said first end connection of said coil member and a conductor over which the energizing potential is received, and a parallel circuit, said parallel circuit comprising a resistor coupled in parallel with a thermistor and coupled between said second end connection of said coil member, and the common connection between the impedance and the conductor connected to said first and second fixed terminals, respectively, of said switch means.

5. The system as set forth in claim 1 wherein said impedance comprises a resistor.

6. The combination as set forth in claim 3 wherein said impedance comprises a resistor.

* * * * *